US009940209B2

United States Patent
He et al.

(10) Patent No.: US 9,940,209 B2
(45) Date of Patent: *Apr. 10, 2018

(54) SVC CLUSTER CONFIGURATION NODE FAILOVER

(71) Applicant: INTERNATIONAL BUSINESS MACHINES CORPORATION, Armonk, NY (US)

(72) Inventors: Hao He, Shanghai (CN); Ling Sun, Shanghai (CN); Jun Wei Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/002,520

(22) Filed: Jan. 21, 2016

(65) Prior Publication Data

US 2016/0140000 A1     May 19, 2016

Related U.S. Application Data

(63) Continuation of application No. 14/459,890, filed on Aug. 14, 2014, now Pat. No. 9,286,169, which is a (Continued)

(30) Foreign Application Priority Data

Sep. 30, 2009  (CN) .......................... 2009 1 0174128

(51) Int. Cl.
| | |
|---|---|
| G06F 11/00 | (2006.01) |
| G06F 11/20 | (2006.01) |
| H04L 12/24 | (2006.01) |
| H04L 29/08 | (2006.01) |
| H04L 29/14 | (2006.01) |

(52) U.S. Cl.
CPC ...... *G06F 11/2007* (2013.01); *G06F 11/2017* (2013.01); *G06F 11/2028* (2013.01); (Continued)

(58) Field of Classification Search
CPC ............. G06F 11/2017; G06F 11/2028; G06F 11/2038; G06F 11/2046; G06F 11/2089; G06F 11/2094
(Continued)

(56) References Cited

U.S. PATENT DOCUMENTS 6,272,386 B1    8/2001  McLaughlin et al.
6,553,401 B1    4/2003  Carter et al.
(Continued)

FOREIGN PATENT DOCUMENTS

CN           101026541 A      8/2007

*Primary Examiner* — Joshua P Lottich
(74) *Attorney, Agent, or Firm* — Griffiths & Seaton PLLC

(57) ABSTRACT

An SVC cluster manages a plurality of storage devices and includes a plurality of SVCs interconnected via a network, each SVC acting as a separate node. A new configuration node is activated in response to configuration node failures. The new configuration node retrieves client subscription information about events occurring in storage devices managed by the SVC cluster from the storage devices. In response to events occurring in the storage device managed by the SVC cluster, the new configuration node obtains storage device event information from a storage device event monitoring unit. The new configuration node sends storage device events to clients who have subscribed to this information according to subscription information obtained. The storage device is not installed in the original configuration node.

22 Claims, 8 Drawing Sheets

Related U.S. Application Data continuation of application No. 13/925,087, filed on Jun. 24, 2013, now Pat. No. 8,868,965, which is a continuation of application No. 13/563,089, filed on Jul. 31, 2012, now Pat. No. 8,495,414, which is a continuation of application No. 12/888,258, filed on Sep. 22, 2010, now Pat. No. 8,296,600.

(52) U.S. Cl.
CPC ...... *G06F 11/2089* (2013.01); *G06F 11/2094* (2013.01); *H04L 41/0668* (2013.01); *H04L 41/0816* (2013.01); *H04L 67/1002* (2013.01); *H04L 67/1097* (2013.01); *H04L 69/40* (2013.01); *G06F 11/2038* (2013.01); *G06F 11/2046* (2013.01); *G06F 2201/85* (2013.01)

(58) Field of Classification Search
USPC .......................................... 714/4.11, 4.12, 13
See application file for complete search history.

(56) References Cited

U.S. PATENT DOCUMENTS

| | | |
|---|---|---|
| 6,859,834 B1 | 2/2005 | Arora et al. |
| 6,883,065 B1 | 4/2005 | Pittelkow et al. |
| 7,003,688 B1 | 2/2006 | Pittelkow et al. |
| 7,043,663 B1 | 5/2006 | Pittelkow et al. |
| 7,076,691 B1 | 7/2006 | Dobberpuhl et al. |
| 7,320,084 B2 | 1/2008 | Steinmetz et al. |
| 7,383,465 B1 | 6/2008 | van Rietschote et al. |
| 7,418,633 B1 | 8/2008 | Salpekar et al. |
| 7,522,616 B2 | 4/2009 | Thompson |
| 7,715,308 B2 | 5/2010 | Ramaswamy |
| 7,730,210 B2 | 6/2010 | Kuik et al. |
| 7,734,947 B1 | 6/2010 | Frangioso et al. |
| 7,793,140 B2 | 9/2010 | Chen et al. |
| 7,836,185 B2 | 11/2010 | Ben-Ezra et al. |
| 7,853,643 B1 | 12/2010 | Martinez et al. |
| 8,046,626 B2 | 10/2011 | Donovan et al. |
| 2003/0188119 A1 | 10/2003 | Lubbers et al. |
| 2004/0034871 A1 | 2/2004 | Lu et al. |
| 2004/0049553 A1 | 3/2004 | Iwamura et al. |
| 2005/0201386 A1 | 9/2005 | Thompson |
| 2006/0117072 A1 | 6/2006 | McKenney et al. |
| 2006/0117212 A1 | 6/2006 | Meyer et al. |
| 2006/0126501 A1 | 6/2006 | Ramaswamy |
| 2007/0079234 A1 | 4/2007 | McCollum et al. |
| 2008/0052556 A1 | 2/2008 | Donovan et al. |
| 2009/0049210 A1 | 2/2009 | Bartlett et al. |
| 2009/0100289 A1 | 4/2009 | Chen et al. |
| 2009/0327494 A1 | 12/2009 | Ben-Ezra et al. |
| 2010/0162032 A1 | 6/2010 | Dodgson et al. |
| 2010/0205392 A1 | 8/2010 | Schnapp et al. |
| 2011/0196940 A1 | 8/2011 | Martinez et al. |

SVC CLUSTER CONFIGURATION NODE FAILOVER

CROSS-REFERENCE TO RELATED APPLICATIONS

The Present Application is a Continuation of U.S. patent application Ser. No. 14/459,890, filed Aug. 14, 2014, which is a Continuation of U.S. patent application Ser. No. 13/925,087, now U.S. Pat. No. 8,868,965, which is a Continuation of U.S. patent application Ser. No. 13/563,089, now U.S. Pat. No. 8,495,414, which is a Continuation of U.S. patent application Ser. No. 12/888,258, now U.S. Pat. No. 8,296,600, which claims priority to Chinese Patent Application No. 200910174128.9, filed Sep. 30, 2009, and entitled "SVG Cluster Configuration Node Failover System and Method."

BACKGROUND

Field of the Invention

The present invention relates to the field of computing technology, and more particularly to a method, system, and computer program for configuration nodes of SVC clusters.

Description of the Related Art

The Network Attached Storage (NAS) platform is already recognized as a key platform for digitization technology. NAS platform needs to be continuously developed to higher standards in terms of storage volume as well as data accessibility, data transmission, data management and storage scalability, in response to the requirements of various applications. It is safe to say that the quality of an NAS platform has a direct impact on the normal operation of the entire system. Therefore, to meet the increasing requirements of applications, a growing number of people have now become aware of the importance of Virtual Storage (VS).

SUMMARY OF THE INVENTION

Various embodiments are provided for a failover response to configuration node failures in a SAN Volume Controller (SVC) cluster. The SVC cluster manages a plurality of storage devices and includes a plurality of SVCs interconnected via the internet. Each SVC acts as a separate node, and at any given time, only one node within the SVC cluster functions as a configuration node to operate external services. A new configuration node is activated in response to failures of an original configuration node. Client subscription information related to storage device events managed by the SVC cluster is obtained with the new configuration node from the plurality of storage devices. The plurality of storage devices are not in the original configuration node. The storage device events are retrieved with the new configuration node from a storage device event monitoring unit in response to the storage device events occurring in the plurality of storage devices managed by the SVC cluster. Storage device events are sent to subscribed clients with the new configuration node based on obtained subscription information.

Additional system and computer program product embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
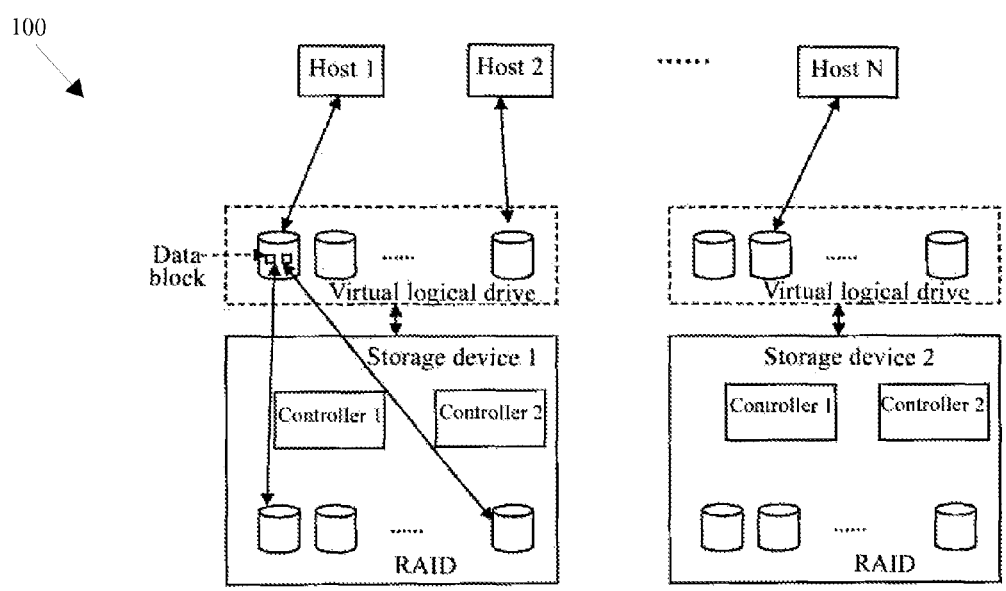
FIG. 1 illustrates the structure of a general symmetrical VS system.

VS refers to a storage method whereby different storage modules (e.g. hard disk and magnetic tape) are subject to centralized management using certain technical means, enabling all storage modules to be managed in a centralized manner within the same Storage Pool. What we see from the host computer or the workstation are partitions rather than hard disks—as if we are accessing a super-size hard disk.

However, Virtualization Technology (VT) is not new. Virtual Storage was introduced for large application software and multi-utility programs as early as the 1970s as a result of the limited storage capacity at that time and cost considerations. Virtual Memory was the most typical VT application back then. With constant development in computing technology and relevant information processing technology over the years, there has been a growing need for ever-bigger storage capacity, leading to advances in VS technology. In this regard there first came Redundant Array of Independent Disks (RAID)—the technology of combining different physical disks into a large-volume virtual disk by means of certain logical relations. Owing to the growing amount of data and increasing demand for data availability, Storage Area Network (SAN) began to gain popularity. By expanding the application of SAN, the aim is to transform storage devices into a "public facility", thus enabling everyone to access data needed via any host whenever and wherever s/he wants. The trend toward storage device communization and SAN popularization has now become unmistakable.

Viewed from a topological perspective, Virtual Storage at the moment can be divided into symmetrical and asymmetrical VS solutions—in the case of the former, the virtual storage controller is integrated with the storage software system and switching equipment, all embedded in the network data transmission path; and in the case of the latter, the virtual storage controller operates independently of the data transmission path. Symmetrical VS structure allows the integration of the storage controller with the Storage Pool subsystem to make up the SAN device. With this VS solution, the storage controller plays a key role in the course of data exchange between the host computer and the Storage Pool. The VS process in this solution is as follows: physical disks in the Storage Pool are virtualized by the built-in storage management system of the storage controller into logical storage devices and port mapping is performed; the host maps all visible storage devices to drive letters identifiable by the operating system; when the host writes data to the SAN device, the user only needs to specify the drive letter mapped by him/her as the location where the data is to be saved; the data is first written to the cache via the parallel port, and conversion of the target location from a logical storage device to a physical disk is automatically carried out by the storage management system of the storage controller—throughout the process, only virtual logical devices are visible to the user and s/he does not need to know the physical organizational structure of each logical storage device.

FIG. 1 is an illustration of the structure of a general symmetrical VS system 100, where we can see that, after passing through the controllers of various devices, the physical disk is converted into a virtual logical drive and therefore usable by the host computer. It is worth pointing out, however, that physical blocks constituting the same virtual logical drive must come from physical disks of the same storage device (i.e., a virtual logical drive cannot be formed by physical blocks coming from different storage devices). Therefore, complete virtualization is not realized in general symmetrical VS technology. In the general symmetrical VS system shown in FIG. 1, failover technology is applied in the storage device. There are primarily two controllers, one serving as the master controller and the other as the slave controller. The latter records all information submitted and received by the master controller, and in the event of a failure of the master controller, it takes the place of the master controller. All information submitted and received by the master controller is stored in the slave controller, so there will be no problem during and following the replacement.

Figure 2:
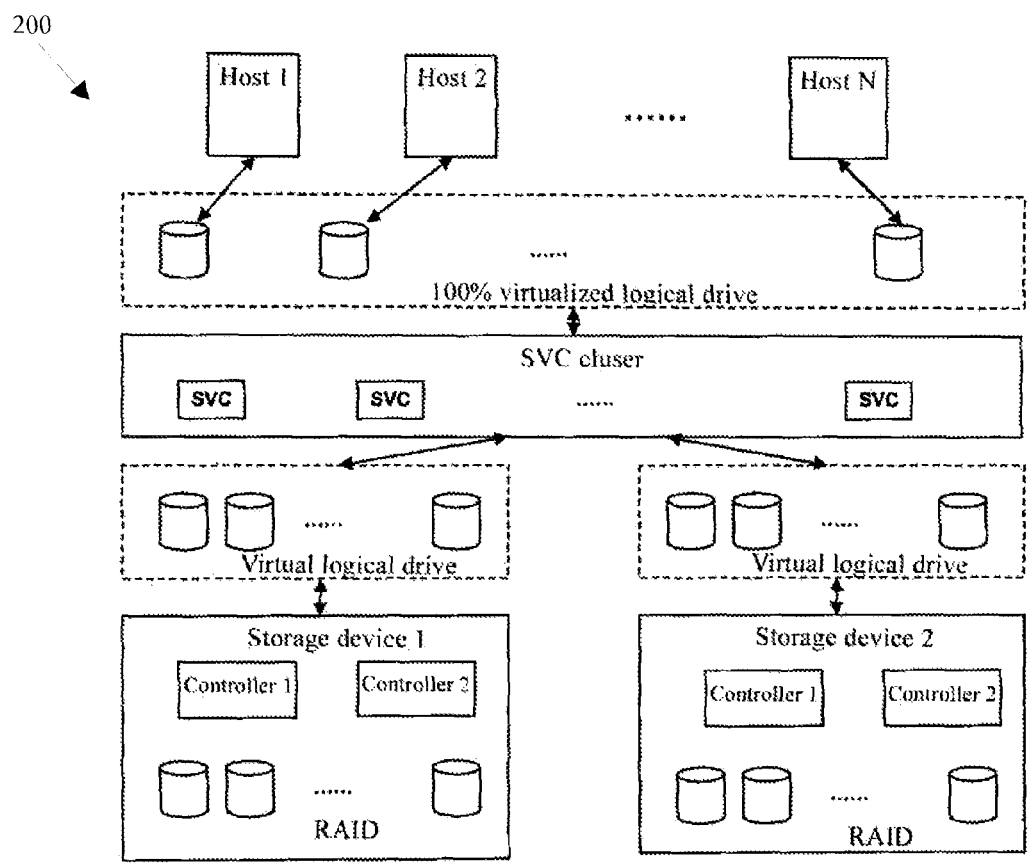
FIG. 2 is a schematic illustration of the structure of a SVC solution based on existing VS technology.

Unlike general symmetrical VS systems, the SVC system based on existing VS technology offers a VS solution characterized by complete virtualization. Such a solution has been proposed and its structure is shown briefly in FIG. 2 in system 200. According to FIG. 2, following extra virtualization in the SVC cluster, all disks are converted into virtual logical drives. In addition, physical blocks constituting the same virtual logical drive may come from physical disks of different storage devices. It is also shown in FIG. 2 that different SVCs are interconnected as a cluster, and every SVC normally comprises eight SVC devices, each functioning as a node. All SVC nodes within a single SVC cluster are structurally identical, i.e. internal services in operation within any given node are identical to those of others. Moreover, at any given time, only one node within the SVC cluster functions as the configuration node to operate external services, e.g. receipt and allocation of configuration commands, and no external service programs can be operated simultaneously in any other node. In the event of a failure of the configuration node entailing a failover, the technical solution adopted here is different from that used in the storage device: in the event of a failure of the configuration node, a new configuration node will be selected through consultation between other nodes (nodes other than the original configuration node), and service programs installed in the chosen node will be activated, replacing the original configuration node with the new one. Apart from improved data accessibility, such a structure brings about a substantial reduction in resources needed for operation.

Compared with that adopted for master and slave controllers, failover technology used in SVC clusters fails to store all information contained in the original configuration node in the newly selected node, giving rise to potential problems following the replacement. To put it precisely, the configuration node of a SVC cluster uses a static IP address for communication with external devices. Thus, in the event of a node failure, the new configuration node selected through consultation between other nodes takes over the static IP address, and services operated in the original configuration node are relocated to the new configuration node, with the original one being reactivated as a non-configuration node. In the case of existing SVC clusters, client subscription information concerning storage device events is all recorded in the original configuration node, and such information will be lost resulting from a failure of the original configuration node, which means that event notifications will not be sent to clients who have previously subscribed to these events.

In view of this, a failover system and method for responding to configuration node failures in SVC clusters is proposed in the present invention. This system and method enables a solution to configuration node failures in a SVC cluster while guaranteeing normal submission of messages to clients who have subscribed to them.

One of the aspects of the invention relates to a failover system for responding to configuration node failures in a SAN Volume Controller (SVC) cluster. The SVC cluster manages a plurality of storage devices and comprises a plurality of SVCs interconnected via the internet, each SVC acting as a separate node. At any given time, only one node within the SVC cluster functions as the configuration node to operate external services.

The system is divided into an activation unit (new configuration node activation in response to configuration node failures), a storage device (storing client subscription information regarding events occurring in storage devices managed by the SVC cluster; the storage device is not in the original configuration node), a storage device (event) monitoring unit (monitoring storage devices managed by the SVC cluster), a first retrieval unit (retrieving subscription information for the new configuration node from the storage devices), a second retrieval unit (retrieving storage device event information for the new configuration node from the storage device event monitoring unit), and a submission device (enabling the new configuration node to send storage device events to clients who have subscribed to this information, according to subscription information obtained).

Another aspect of the invention relates to a failover method for responding to configuration node failures in a SVC cluster. The SVC cluster manages a plurality of storage devices and comprises a plurality of SVCs interconnected via the internet, each SVC acting as a separate node. At any given time, only one node within the SVC cluster functions as the configuration node to operate external services. Configuration node failures and the activation of new configuration nodes are responded to. Client subscription information regarding events occurring in storage devices managed by the SVC cluster is obtained by the new configuration node from the storage device (which is not in the original configuration node). In response to events occurring in the storage device managed by the SVC cluster, the new configuration node retrieves storage device event information from the storage device event monitoring unit. The new configuration node is enabled to send storage device events to clients who have subscribed to this information, according to subscription information obtained.

The preferred embodiments of the invention will be further specified in detail by reference to the attached drawings, and preferred examples of the invention are shown in the drawings. However, there are various ways for implementing the invention, which should not be limited to the current examples. On the contrary, these examples are provided here with the aim of making the invention more transparent and complete, as well as conveying the scope of the invention to relevant technical professionals.

Figure 3:
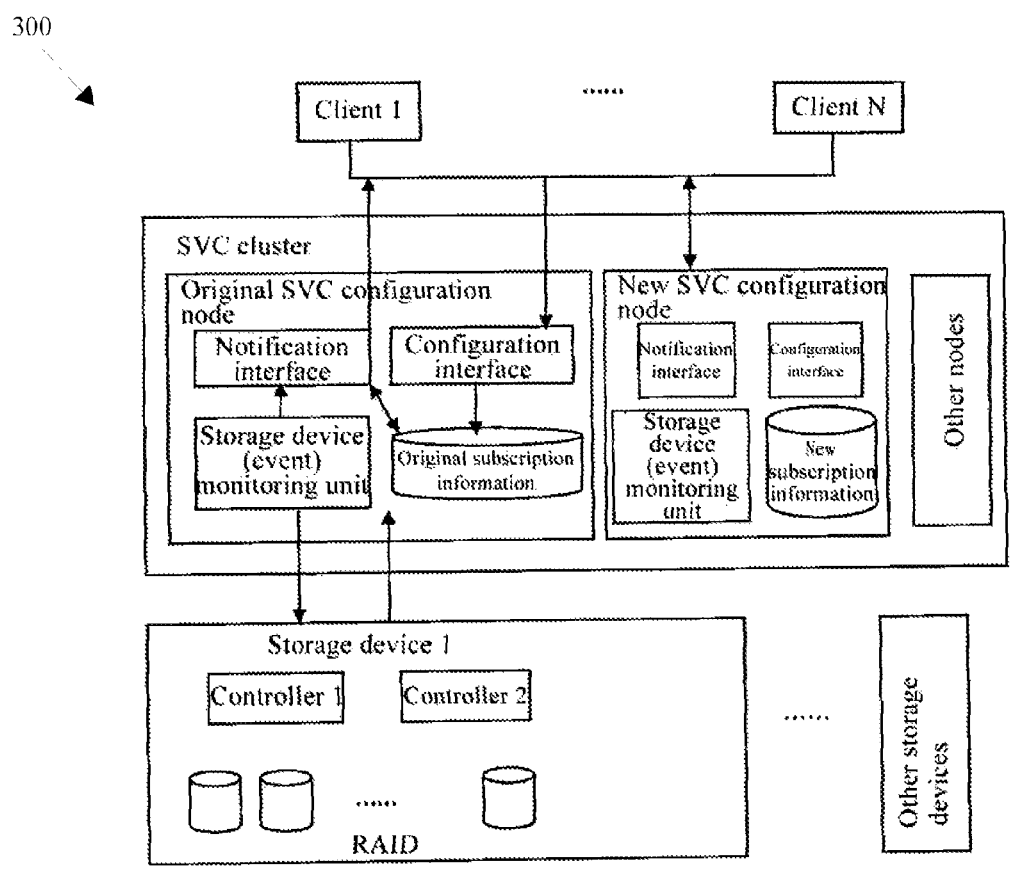
FIG. 3 is a structure chart of existing SVC clusters with reference to subscription information contained therein.

FIG. 3 is a structure chart of a system 300 including existing SVC clusters with reference to subscription information contained therein. Configuration nodes of existing SVC clusters use static IP addresses for communication with external devices. Such configuration nodes are equipped with a configuration interface and a notification interface: the configuration interface works to request the clients to submit to the configuration node their subscription information (i.e. storage device events managed by the SVC cluster subscribed by the clients, including client ID or IP address and information subscribed, etc), and store such client subscription information in the configuration node; the notification interface is responsible for notifying the clients of information concerning storage device events to which they have subscribed when these events occur. In addition, the configuration node is also equipped with a storage device event monitoring unit, enabling it to communicate with the storage device controller managed by the SVC cluster and therefore to record events occurring in the storage device. The same interfaces are also available in the new configuration node, but, in the case of existing SVC clusters, information about storage device events subscribed by clients stored in the original configuration node becomes irretrievable once the original configuration node is replaced by the new one. Device monitoring cannot be performed until the new configuration node is activated. As a result, clients must re-subscribe to events in which they are interested following the node replacement; otherwise they will not receive notifications about these events.

Figure 4:
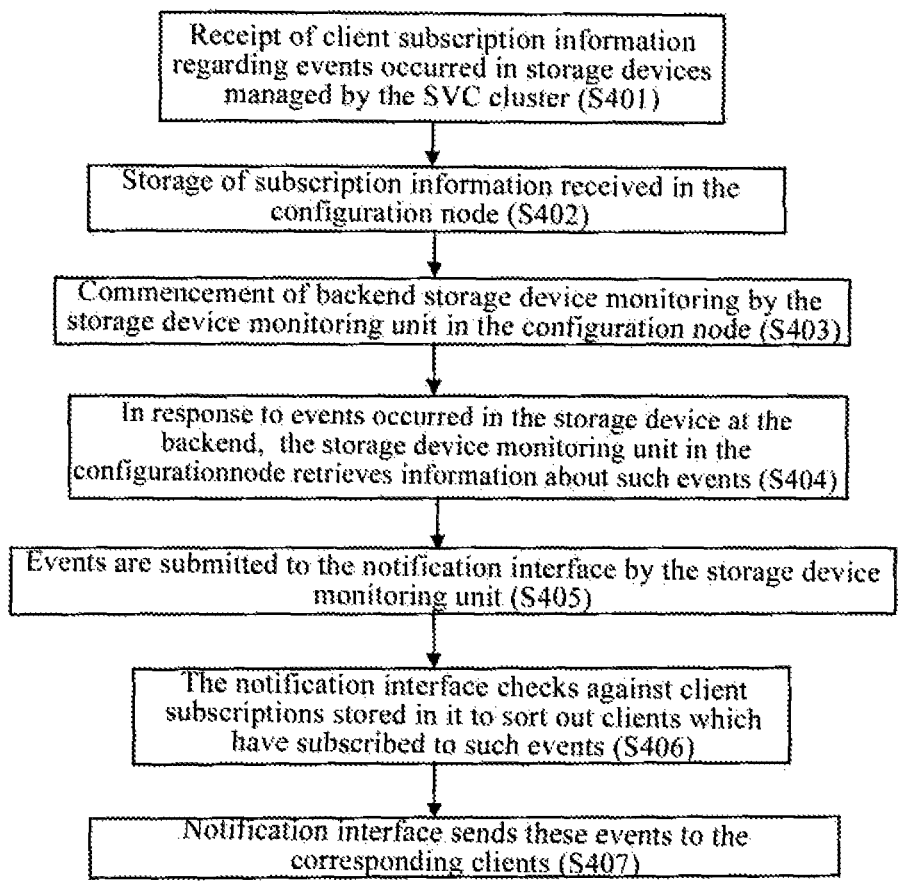
FIG. 4 illustrates the subscription information related method and procedure adopted in existing SVC clusters.

FIG. 4 illustrates the subscription information related method and procedure in existing SVC clusters. The process shown in FIG. 4 is divided into separate stages: S401—(following the creation of the SVC cluster) receipt of client subscription information regarding events occurring in storage devices managed by the SVC cluster; S402—storage of subscription information received in the configuration node; S403—commencement of backend storage device monitoring by the storage device event monitoring unit in the configuration node (S403, S401 and S402 may be carried out either simultaneously or in the sequence given in FIG. 4); S404—in response to events (e.g. a faulty drive or a power failure in one of the hard disks) occurring in the storage device at the backend, the storage device event monitoring unit in the configuration node retrieves information about these events; S405—these events are then submitted to the notification interface by the storage device event monitoring unit; S406—the notification interface checks against client subscriptions stored in it to sort out clients who have subscribed to these events; S407—the notification interface sends these events to the corresponding clients.

Needless to say, according to the subscription information related method and procedure adopted in existing SVC clusters, the configuration node is the most important node in the entire cluster, and it handles by far the largest data traffic compared with all other nodes. Given the excessive resource consumption resulting from such heavy data traffic, the configuration node is likely to experience technical problems, causing the entire SVC cluster and therefore the VS system to break down. To tackle this problem, the existing failover technology proposes that the operating status of the configuration node be monitored by other nodes and, in the event of a failure (occurring in the original configuration node), another node be selected through consultation as the new configuration node to take over the static IP address formerly assigned to the original configuration node, which will then be reactivated as a non-configuration node. However, in existing SVC clusters, the configuration node is responsible for both monitoring and notification. In other words, all client subscription records are stored in the original configuration node, and such records will be lost following a failure of the original configuration node, which means clients will not receive notifications concerning device events to which they have previously subscribed. Furthermore, device monitoring cannot be performed until the new configuration node is activated, as a result of which all events occurring during the node replacement process will be lost, making it impossible to notify relevant clients of these events. Thus, a new cluster structure allowing for potential failover operations is needed for a satisfactory solution to this issue.

Figure 5:
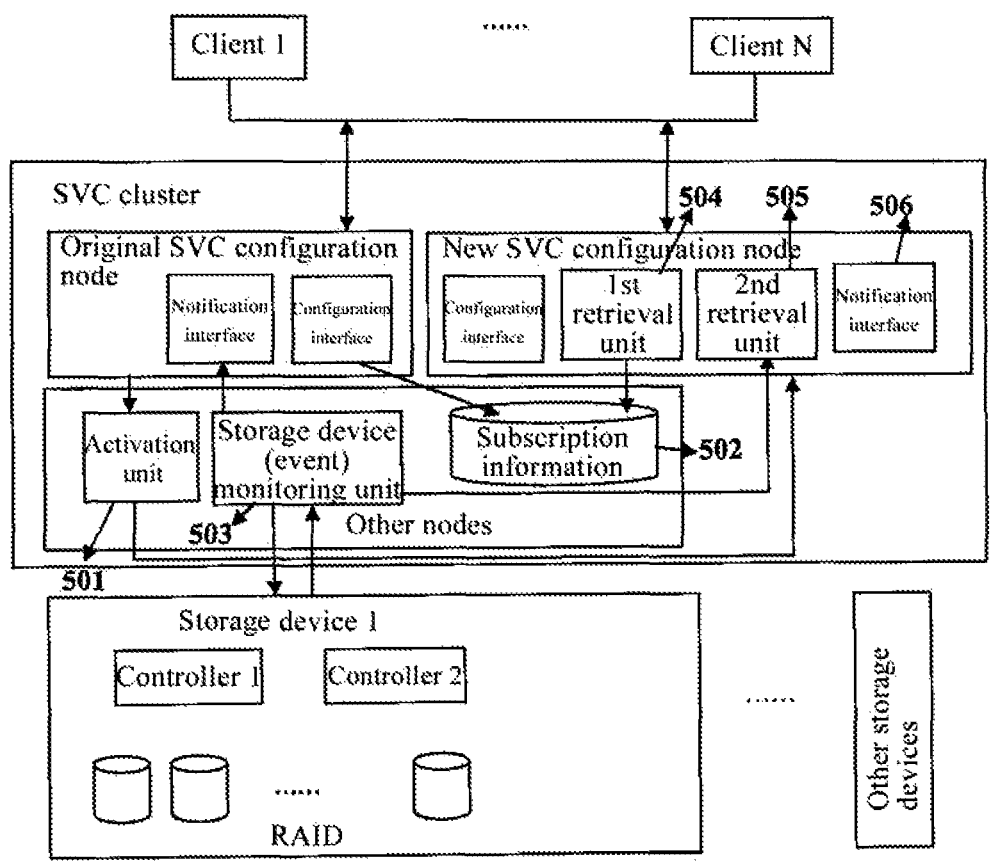
FIG. 5 is a structure chart of a SVC cluster configuration node failover system designed based on one of the embodiments of the invention.

FIG. 5 is a structure chart of a SVC cluster configuration node failover system designed based on one of the embodiments of the invention. This SVC cluster manages a plurality of storage devices and comprises a plurality of SVCs interconnected via the internet, each SVC acting as a separate node. At any given time, only one node within the SVC cluster functions as the configuration node to operate external services. In the present invention, instead of being installed within the original configuration node, the device for storing client subscription information can be located in the new configuration node, or even any other place outside the SVC cluster provided the device is accessible to the new configuration node. The system includes the components described below.

An activation unit (501) serves to respond to configuration node failures and activate new configuration nodes. The activation unit may be installed in any node within the SVC cluster other than the original configuration node, and is capable of monitoring the operating status of the original configuration node (i.e. whether it is experiencing any technical problems) through various means—a simple way to do this is by monitoring the "heartbeat" of the original configuration node, i.e. detecting node malfunction by means of Packet Internet Group (PING)—the easiest network command. Other more complicated methods include CPU and memory monitoring, etc.

A storage device (502) stores client subscription information regarding events occurring in storage devices managed by the SVC cluster. A storage device (event) monitoring unit (503) monitors storage devices managed by the SVC cluster.

A first retrieval unit (504) retrieves client subscription information from the storage device (502). A second retrieval unit (505) retrieves storage device event information from the storage device event monitoring unit (503).

A notification interface (506) sends storage device events to clients who have subscribed to this information, according to subscription information obtained.

Following the activation of the new configuration node, this solution allows clients to continue receiving device event notifications to which they have previously subscribed. It is therefore completely transparent to the clients. In addition, in the unlikely event that the newly selected configuration node happens to host the storage device (502) after its activation, the storage device may be relocated to another node or storage space, thus ensuring consistent submission of device event information to clients who have previously subscribed to these events. Preferably, the storage device event monitoring unit can be installed in any node within the SVC cluster other than the configuration node, so as to prevent possible loss of event information as a result of configuration node failure. Similarly, after successful activation of the new configuration node, if the newly selected configuration node happens to host the storage device event monitoring unit (503), the storage device event monitoring unit may be relocated to another node or storage space, thus ensuring consistent submission of device event information to clients who have previously subscribed to these events.

Moreover, storage device events may also occur during the intervening period between a failure of the original configuration node and activation of the new configuration node. Given the fact that the new configuration node is not capable of receiving device event information until its activation, information of events occurring during the intervening period will be lost, making it impossible for clients to receive such information. Thus, in one of the embodiments of the present invention based on the system structure shown in FIG. 5, the storage device event log of the original configuration node is also recorded in one or more non-configuration nodes within the SVC cluster. The event log may be stored together with client subscription information in the same storage device or in a separate storage device. It should contain at least event code, handled or unhandled event, and preferably time of event occurrence and a brief event description. The log can be saved either as a text file or as a database. The storage device event monitoring unit of the original configuration node makes an entry in said event log every time it receives a storage device event, and sets the status of the event to "No". After the notification interface of the original configuration node submits the event to relevant clients, the event status will be changed to "Yes". As a result, upon activation of the new configuration node, all entries marked as "No" in the event log will be sorted out, and the corresponding events will be sent to clients who have subscribed to these events according to subscription information kept in the storage device. If this solution is to be adopted, not only will the clients be enabled to continue receiving notifications to which they have previously subscribed, but device events occurring during the transitional process will also be saved and submitted to the clients.

In another embodiment of the invention which is also based on the system structure shown in FIG. 5, the storage device event log of the original configuration node is also utilized, but any of the entries in the event log contain at least event code, event description and Time of event occurrence. The storage device event monitoring unit of the original configuration node makes an entry in said event log every time it receives a storage device event, and records the time when the event occurs under the item "time of event occurrence". In the event of a failure of the original configuration node being detected by the activation unit, it will record the time when the failure occurs. Following successful activation of the new configuration node, the new configuration node works out storage device events (recorded in the event log) occurring between the failure of the original configuration node and activation of the new node (according to the failure and activation time recorded). It will then sort out clients who have subscribed to events occurring during the intervening period based on subscription information saved in the storage device, and information relevant to these events will be submitted to the clients accordingly. If this solution is to be adopted, not only will the clients be enabled to continue receiving notifications to which they have previously subscribed, but device events occurring during the transitional process will also be saved and submitted to the clients.

Figure 6:
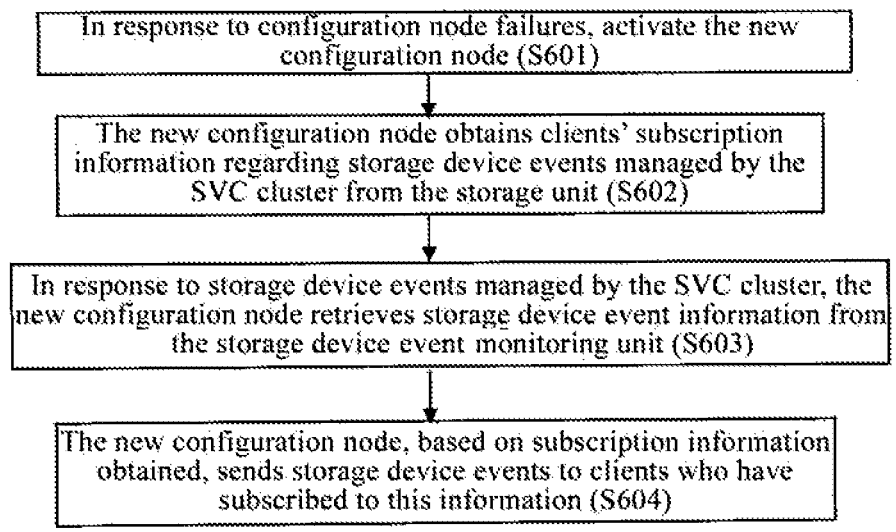
FIG. 6 is a flow chart of a SVC cluster configuration node failover system designed based on one of the embodiments of the invention.

Following the same inventive concept, FIG. 6 provides a flow chart of a SVC cluster configuration node failover system designed based on one of the embodiments of the invention. This SVC cluster manages a plurality of storage devices and comprises a plurality of SVCs interconnected via the internet, each SVC acting as a separate node. At any given time, only one node within the SVC cluster functions as the configuration node to operate external services. The method involves a series of stages: S601—responding to configuration node failures and activating the new configuration node; S602—client subscription information regarding events occurring in storage devices managed by the SVC cluster is obtained by the new configuration node from the storage device; S603—in response to events occurring in the storage device managed by the SVC cluster, the new configuration node retrieves storage device event information from the storage device event monitoring unit; S604—the new configuration node sends storage device events to clients who have subscribed to this information, according to subscription information obtained (the storage device is not installed in the original configuration node). Following the activation of the new configuration node, this solution allows clients to continue receiving device event notifications to which they have previously subscribed. It is therefore completely transparent to the clients. Preferably, the storage device event monitoring unit can be installed in any node within the SVC cluster other than the configuration node, so as to prevent possible loss of event information during the failover process as a result of configuration node failure.

Figure 7:
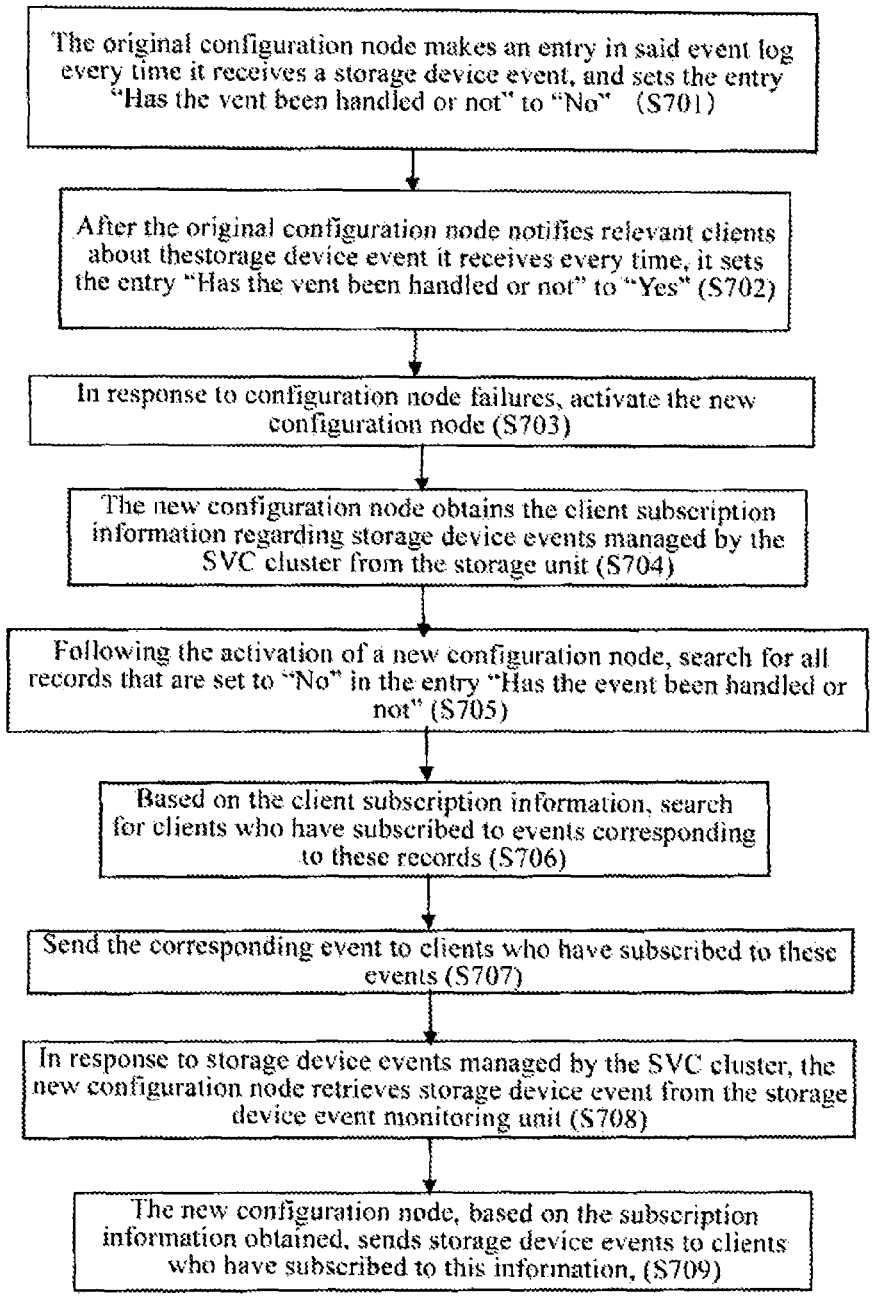
FIG. 7 is a flow chart based on another embodiment of the invention.

In another embodiment of the present invention, the storage device event log of the original configuration node is recorded in one or more non-configuration nodes within the SVC cluster, and any of the entries in the event log contain at least event code, event description, and handled or unhandled event. FIG. 7 is a flow chart based on this embodiment of the invention. The process shown in FIG. 7 is divided into separate stages: S701—the original configuration node makes an entry in said event log every time it receives a storage device event, and sets the status of the event entered to "No"; S702—after the original configuration node submits the event to relevant clients, status of the event will be changed to "Yes"; S703—responding to configuration node failures and activating the new configuration node; S704—client subscription information regarding events occurring in storage devices managed by the SVC cluster is obtained by the new configuration node from the storage device; S705—following the activation of a new configuration node, all entries marked as "No" in the storage device event log are sorted out (there is no mandatory sequence for S704 and S705—either of them can be performed first, provided both of they are completed before S705); S706—clients who have subscribed to the corresponding events are listed according to client subscription information obtained; S707—relevant event information is sent to clients who have subscribed to these events; S708—in response to events occurring in the storage device managed by the SVC cluster, the new configuration node retrieves storage device event information from the storage device event monitoring unit; S709—the new configuration node sends storage device events to clients who have subscribed to this information, according to subscription information obtained, thus enabling all device events occurring throughout the failover process to be sent to the corresponding clients.

Figure 8:
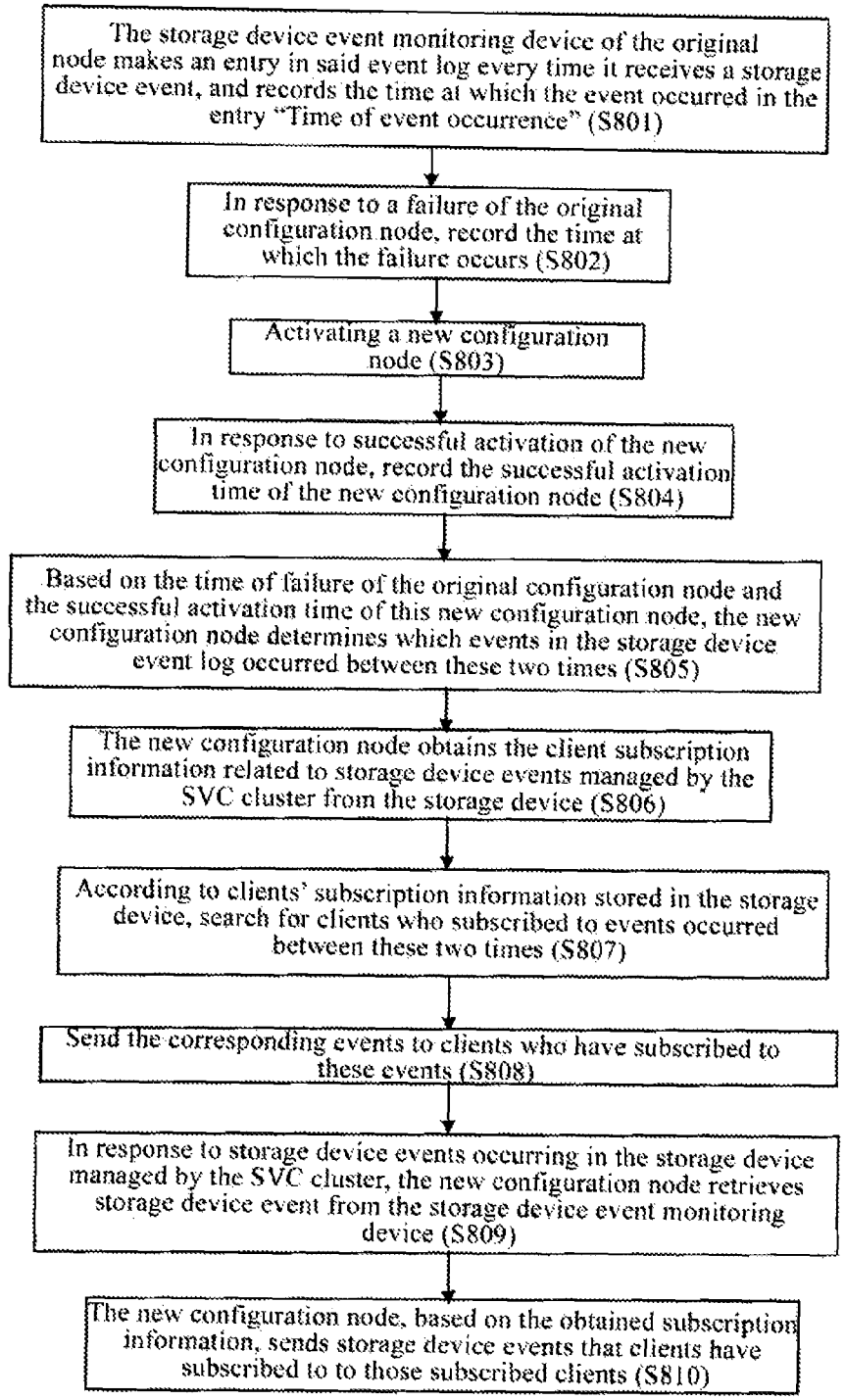
FIG. 8 is a flow chart based on yet another embodiment of the invention.

In yet another embodiment of the present invention, the storage device event log of the original configuration node is also recorded in one or more non-configuration nodes within the SVC cluster, and any of the entries in the event log contain at least event code, event description and Time of event occurrence. FIG. 8 is a flow chart based on the invention embodiment under discussion here. The process shown in FIG. 8 is divided into separate stages: S801—the storage device event monitoring unit of the original configuration node makes an entry in said event log every time it receives a storage device event, and records the time when the event occurs under the item "Time of event occurrence"; S802—in response to a failure of the original configuration node, recording the time when the failure occurs; S803—activating a new configuration node; S804—in response to successful activation of the new configuration node, recording the time of its activation; S805—the new configuration node works out storage device events (recorded in the event log) occurring between the failure of the original configuration node and activation of the new node according to the failure and activation time recorded; S806—client subscription information regarding events occurring in storage devices managed by the SVC cluster is obtained by the new configuration node from the storage device; S807—clients who have subscribed to events occurring during the intervening period are listed based on subscription information obtained from the storage device; S808—information relevant to these events is submitted to the clients accordingly; S809—in response to events occurring in the storage device managed by the SVC cluster, the new configuration node retrieves storage device event information from the storage device event monitoring unit; S810—the new configuration node sends storage device events to clients who have subscribed to this information, according to subscription information obtained, thus enabling all device events occurring throughout the failover process to be sent to the corresponding clients.

Descriptions of exemplary embodiments of the invention are provided above in reference to the attached drawings. However, it should be understood that the present invention is not limited to these detailed embodiments, and within the scope and the objectives specified for this invention, changes and/or modifications of varying types may be introduced to the invention by ordinary technicians in the field. All such changes and/or modifications shall be intended to be restricted to the scope of the invention set out in the Claims attached hereto.

Based on description above, technicians in the relevant field understand that the invention may take the form of means, method, or computer software product—more precisely, it may be implemented in the form of 100% hardware, 100% software (including firmware, (memory) resident software, microcode, etc.), or software-hardware combinations which are usually called "circuit", "module" or "system" in the present document. In addition, the present invention may also take the form of computer software product in any physical medium of expression. Computer-readable programming codes should be contained in such medium of expression.

A combination of any one or more computer-readable/usable media may be used. Computer-readable media include, but are not limited to, electric, magnetic, optic, electromagnetic, infrared, or semi-conductive systems, means, devices or media of expression. Below is a list of specific examples of computer-readable media (this is not an exhaustive list): single/multi-lead electric connect, portable computer disk, hard disk, RAM, ROM, EPROM (or flash memory), optic CD-ROM, optic storage device, internet/intranet-compatible data transmission medium or magnetic storage device. Please note that computer-readable/usable media can even be paper (or other suitable media) printed with computer programs, due to the fact that, for example, the computer program may be obtained by electronically scanning this piece of paper (or another medium) and then be compiled, interpreted or processed in an appropriate manner, and, where necessary, stored in a computer storage device. In the context of the present document, computer-readable/usable media refers to any medium containing, storing, transmitting or broadcasting programs which are intended for use by command execution systems, means or devices or which are connected with command execution systems, means or devices. Computer-readable media may include digital signals representing computer-readable programming codes contained in base-band or broadcast as part of carriers. Computer-readable programming codes may be transmitted via any suitable media, including, but not limited to, wireless connection, electric wire, optic cable and RF.

Computer programming codes for executing operations of the present invention may be written using a combination of any one or more programming language(s), which include object-oriented programming language (e.g. Java, Smalltalk, C++), conventional procedural programming languages (e.g. C Programming Language and other similar programming languages). Programming codes can be executed: completely or partly on the user's computer; as a separate software package; partly on the user's computer and partly on a remote computer; or completely on a remote computer. In the last case, the remote computer may by connected to the user's computer via any kind of network, including both LAN and WAN. Alternatively, the remote computer may also be connected (for example, using internet connection provided by an ISP) to an external computer.

In addition, any and all of the textboxes contained in the flow charts and/or block diagrams attached hereto can be realized by means of computer programming instruction. Such computer programming instructions may be provided for the processors of general purpose computers, special purpose computers or other programmable data processing devices to produce a machine, enabling these instructions executed by computers or other programmable data processing devices to create a means for performing functions/tasks specified in textboxes contained in flow charts and/or block diagrams attached hereto.

Such computer programming instructions may also be stored in a computer-readable medium which is capable of controlling the computer or the programmable data processing device to operate in a certain way, thus enabling the computer-readable medium to create a product which contains instruction means for performing functions/tasks specified in textboxes contained in flow charts and/or block diagrams attached hereto.

Alternatively, such computer programming instructions may also be loaded onto a computer or another programmable data processing device, which will then be activated to perform a series of operations to complete the computer implementation process. The execution of such instructions on the computer or programmable data processing device is a process in which functions/tasks specified in textboxes contained in flow charts and/or block diagrams attached hereto are performed.

Flow charts and block diagrams attached hereto illustrate system structures, functions and operations, which may be realized by systems, methods and computer program products created based on various embodiments of the present invention. In this regard, every textbox contained in the flow charts or block diagrams represents a module, program segment, or part of the codes. Such module, program segment or part of the codes contains one or more executable instruction(s) designed to perform prescribed logic functions. Please note that, in the case of some exchangeable implementations, functions specified in the textboxes may be carried out in an order other than that given in the drawing. For example, two adjoining textboxes may be, in practice, simultaneously performed or, in some cases, even implemented in reverse order, all depending on the function to be performed. It is also worth pointing out that textboxes contained in the block diagrams/flow charts and combinations of textboxes contained in the block diagrams/flow charts may be implemented using dedicated hardware-based systems, which are designed to perform prescribed functions or operations, or by a combination of special hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A failover method for responding to configuration node failures in a SAN Volume Controller (SVC) cluster, wherein the SVC cluster manages a plurality of storage devices and comprises a plurality of SVCs interconnected via the internet, each SVC acting as a separate node, and at any given time, only one node within the SVC cluster functions as a configuration node to operate external services, the method comprising:
    retrieving storage device events from a storage device event monitoring unit with a new configuration node in response to the storage device events occurring in the plurality of storage devices managed by the SVC cluster; and
    saving with an original configuration node a storage device event log in the plurality of storage devices; wherein the storage device event monitoring unit is in a node other than the original configuration node of the SVC cluster.

2. The method according to claim 1, further comprising performing one of:
    obtaining client subscription information related to the storage device events managed by the SVC cluster from the plurality of storage devices with the new configuration node, wherein the plurality of storage devices are not in the original configuration node; and
    sending storage device events to subscribed clients with the new configuration node based on obtained subscription information.

3. The method according to claim 1, wherein any of the entries in the storage device event log contains at least the following information: an event code; an event description; and whether the event has been handled or not.

4. The method according to claim 3, wherein the saving of the storage device event log in the plurality of storage devices with the original configuration node comprises:
    with the original configuration node, making an entry in said event log every time the original configuration node receives a storage device event and setting the entry to NO for whether the event has been handled or not; and
    with the original configuration node, setting the entry to YES for whether the event has been handled or not after the original configuration node notifies the respective subscribed clients about the storage device events the original configuration node receives.

5. The method according to claim 4, further comprising:
    with the new configuration node, searching for entries that are set to NO for whether the event has been handled or not in the storage device event log after activation;
    searching for subscribed clients who have subscribed to events corresponding to all records based on stored subscription information; and
    sending the corresponding events to clients who have subscribed to these events.

6. The method according to claim 1, wherein any of the entries in the storage device event log contains a time of event occurrence.

7. The method according to claim 6, further comprising:
    with the original configuration node, making an entry in the storage device event log every time the original configuration node receives a storage device event and recording the time at which the event occurs for the time of event occurrence.

8. The method according to claim 7, further comprising:
    recording a time at which a failure of the original configuration node occurs in response to the failure of the original configuration node;
    recording successful activation of the new configuration node in response to a successful activation of the new configuration node;
    determining which events in the storage device event log occurred between the failure time of the original configuration node and the successful activation time of the new configuration node based on the failure time of the original configuration node and the successful activation time of the new configuration node;
    searching for subscribed clients for the events that occurred between the failure time of the original configuration node and the successful activation time of the new configuration node based on the stored subscription information in a storage device; and
    sending the corresponding events to the subscribed clients for the events that occurred between the failure time of the original configuration node and the successful activation time of the new configuration node.

9. A failover system for responding to configuration node failures in a SAN Volume Controller (SVC) cluster, the SVC cluster manages a plurality of storage devices and comprises a plurality of SVCs interconnected via the internet, each SVC acting as a separate node, and at any given time, only one node within the SVC cluster functions as a configuration node to operate external services, the system comprising:
    a hardware processor; and
    a storage device event monitoring unit to retrieve the storage device events with a new configuration node in response to storage device events occurring in the plurality of storage devices managed by the SVC cluster; and
    monitor storage devices managed by the SVC cluster, wherein the storage device event monitoring unit is in a node other than an original configuration node of the SVC cluster; and the storage device is used to store event log information of the original configuration node.

10. The failover system according to claim 9, the system further comprising at least one of:
- a storage device to store clients' subscription information regarding the storage device events managed by the SVC cluster, and the storage device is not in the original configuration node;
- a retrieval unit to enable the new configuration node to retrieve subscription information from storage devices; and
- a submission device to enable the new configuration node to send storage device events to subscribed clients based on subscription information.

11. The failover system according to claim 9, wherein any of the entries in the storage device event log contains at least the following information: an event code; an event description; and whether the event been handled or not.

12. The failover system according to claim 11, wherein the storage device event monitoring unit of the original configuration node makes an entry in the event log every time the storage device event monitoring unit receives a storage device event and sets the entry to NO for whether the event been handled or not and sets the entry to YES for whether the event has been handled or not after a notification interface of the original configuration node notifies the respective subscribed clients.

13. The failover system according to claim 12, wherein following the activation of the new configuration node, the new configuration node searches for all the entries which have been set to NO for whether the event has been handled or not, searches for the subscribed clients who have subscribed to events corresponding to the entries which have been set to NO for whether the event has been handled or not based on the subscription information, and sends the corresponding events to the respective subscribed clients.

14. The failover system according to claim 9, wherein any of the entries in the storage device event log contains a time of event occurrence.

15. The failover system according to claim 14, wherein the storage device event monitoring unit of the original configuration node makes an entry in the event log every time the storage device event monitoring unit receives a storage device event and records the time at which the event occurred for the time of event occurrence.

16. The failover system according to claim 15, wherein:
- when the activation unit monitors a failure of the original configuration node, the activation unit records the time at which the failure of the original configuration node occurs,
- the new configuration node records the successful activation time of the new configuration node following successful activation of the new configuration node, and
- the new configuration node determines which events in the storage device event log occurred between the failure time of the original configuration node and the successful activation time of the new configuration node based on the failure time of the original configuration node and the successful activation time of the new configuration node and searches for subscribed clients for the events that occurred between the failure time of the original configuration node and the successful activation time of the new configuration node based on the subscription information stored in the storage device and the corresponding events to the subscribed clients for the events that occurred between the failure time of the original configuration node and the successful activation time of the new configuration node.

17. A computer program product for responding to configuration node failures in a SAN Volume Controller (SVC) cluster, the computer program product comprising a non-transitory computer-readable storage medium having computer-readable program code portions stored therein, the computer-readable program code portions comprising:
- an executable portion for retrieving storage device events from a storage device event monitoring unit with a new configuration node in response to the storage device events occurring in the plurality of storage devices managed by the SVC cluster; and
- an executable portion for saving with an original configuration node a storage device event log in the plurality of storage devices; wherein the storage device event monitoring unit is in a node other than the original configuration node of the SVC cluster.

18. The computer program product of claim 17, further comprising at least one of:
- an executable portion for obtaining with the new configuration node client subscription information related to the storage device events managed by the SVC cluster from a plurality of storage devices managed by the SVC, wherein the plurality of storage devices are not in the original configuration node; and
- an executable portion for sending storage device events to subscribed clients with the new configuration node based on obtained subscription information.

19. The computer program product according to claim 17, wherein any of the entries in the storage device event log contains at least the following information: an event code; an event description; and whether the event has been handled or not.

20. The computer program product according to claim 19, wherein the saving of the storage device event log in the plurality of storage devices with the original configuration node comprises:
- with the original configuration node, making an entry in said event log every time the original configuration node receives a storage device event and setting the entry to NO for whether the event has been handled or not; and
- with the original configuration node, setting the entry to YES for whether the event has been handled or not after the original configuration node notifies the respective subscribed clients about the storage device events the original configuration node receives.

21. The computer program product according to claim 20, further comprising:
- an executable portion for searching for entries that are set to NO for whether the event has been handled or not in the storage device event log after activation with the new configuration node;
- an executable portion for searching for subscribed clients who have subscribed to events corresponding to all records based on the stored subscription information; and
- an executable portion for sending the corresponding events to clients who have subscribed to these events.

22. The computer program product according to claim 17, wherein any of the entries in the storage device event log contains a time of event occurrence.

* * * * *